US006921481B2

(12) United States Patent
Jessop et al.

(10) Patent No.: US 6,921,481 B2
(45) Date of Patent: Jul. 26, 2005

(54) AUTOMATIC BACKWASH FILTER SYSTEM

(75) Inventors: Jack H. Jessop, Midlothian, VA (US); Harold W. Johnson, Jr., Midlothian, VA (US)

(73) Assignee: Ondeo Degremont, Inc., VA (US)

( * ) Notice: Subject to any disclaimer, the term of this patent is extended or adjusted under 35 U.S.C. 154(b) by 157 days.

(21) Appl. No.: 10/174,273

(22) Filed: Jun. 18, 2002

(65) Prior Publication Data

US 2003/0230525 A1 Dec. 18, 2003

(51) Int. Cl.[7] .............................................. B01D 24/46
(52) U.S. Cl. ....................... 210/274; 210/275; 210/279; 210/264; 210/284; 210/286; 210/293; 210/793; 210/794; 210/795
(58) Field of Search ................................ 210/274, 275, 210/279, 264, 284, 286, 293, 793, 794, 795

(56) References Cited

U.S. PATENT DOCUMENTS

| | | | | |
|---|---|---|---|---|
| 3,984,326 A | * | 10/1976 | Bendel | 210/264 |
| 4,211,656 A | * | 7/1980 | Cochrane | 210/149 |
| 5,078,873 A | * | 1/1992 | Black et al. | 210/264 |
| 5,618,421 A | * | 4/1997 | Sorosinski | 210/264 |
| 6,261,453 B1 | * | 7/2001 | Savage | 210/274 |
| 6,325,931 B1 | * | 12/2001 | Roberts et al. | 210/293 |
| 6,423,216 B1 | * | 7/2002 | Yum et al. | 210/150 |
| 6,569,327 B2 | * | 5/2003 | Roberts et al. | 210/274 |
| 6,569,328 B1 | * | 5/2003 | Haggard | 210/275 |

* cited by examiner

*Primary Examiner*—Minh-Chau T. Pham
(74) *Attorney, Agent, or Firm*—DLA Piper Rudnick Gray Cary US LLP

(57) ABSTRACT

The invention is directed to an automatic backwash filter system that includes at least one influent port for introducing a fluid to the filter; a plurality of partitions forming a plurality of compartments for holding a filtering media for filtering the fluid; at least one porous plate for supporting the plurality of partitions; wherein each of the partitions is mounted atop a continuous portion of the porous plate; and at least one effluent port for draining the fluid away from the compartments. The filter may also include a filter media comprising one or more selected from the group consisting of sand, anthracite coal, and activated carbon. The invention also includes a method for preparing the automatic backwash filtering system that includes the steps of arranging a plurality of partitions to form a plurality of compartments for holding a filtering media for filtering a fluid; binding together a plurality of porous plates by a lap joint at least one of the partitions; and securing the plurality of partitions to the plurality of porous plates so that each of the partitions is mounted atop a continuous portion of the porous plate to prevent the filtering media from passing therethough. Each of the plurality of partitions may be secured to the porous plate with angles and mounting bolts.

21 Claims, 5 Drawing Sheets

AUTOMATIC BACKWASH FILTER SYSTEM

FIELD OF THE INVENTION

This invention is directed to a filtration system utilizing an automatic backwash filter. Particularly, the invention is directed to an automatic backwash filter underdrain utilizing an improved assembly system.

BACKGROUND

Automatic backwash traveling bridge rapid sand filters are commonly used for the treatment of municipal and industrial water supplies as well as wastewater effluents. Owners attest to the outstanding performance and economics of the automatic backwash filter. In large part, the automatic backwash filter has stayed in the forefront of treatment technology.

The conventional automatic backwash filter underdrain design has been in use since the late 1940's. The original design was constructed out of steel, which was changed to fiberglass in the mid 1970's. An illustration of the conventional automatic backwash filter design is shown in FIGS. 1(a)–(b). Conventional filter underdrain 100 consists of a series of lateral partitions 101, which divide the filter bed into a multitude of compartments 102. Each compartment is arranged for connection to a separate effluent or backwash port 103. Within each partition 101, above the ports, there is a porous plate 104.

Porous plate 104 acts as a supporting deck or ledge for filter sand media 105 in each separate compartment 102. Porous plates 104 are typically formed from a heavy plastic, such as polyethylene, or ceramics, and are designed to support the weight of the filters and media, which is typically at a depth of 11 inches. In a typical configuration, five porous plates, each measuring 30 inches long by 12 inches wide are installed in each of a sixteen-foot wide compartment, or cell.

The joints between each of these porous plates must be properly sealed to prevent the sand media from leaking into the effluent port area. The porous plate is typically sealed in each cell utilizing caulking. As shown in FIG. 1(b), each porous plate 104 is typically mounted to the partition and secured in place by angle 106 and mounting bolt hardware 107. The space between porous plate 104 and partition 101 is filled with caulking 108.

However, it has been found that this conventional design has certain problems. These include the fact that the field installation of the system is labor intensive, caulking must be installed under clean and dry conditions, the caulking must be applied very consistently to provide an adequate seal, the sand media develops leaks in the caulk area, and the sand media leaks are difficult and expensive to repair.

Accordingly, a system is needed that is substantially leak proof and significantly reduces material and labor installation costs.

SUMMARY OF THE INVENTION

The invention is directed to an automatic backwash filter system that includes at least one influent port for introducing a fluid to the filter; a plurality of partitions forming a plurality of compartments for holding a filtering media for filtering the fluid; at least one porous plate for supporting the plurality of partitions; wherein each of the partitions is mounted atop a continuous portion of the porous plate; and at least one effluent port for draining the fluid away from the compartments. The filter may also include a filter media comprising one or more selected from the group consisting of sand, anthracite coal, and activated carbon.

The invention also includes a method for preparing the automatic backwash filtering system that includes the steps of arranging a plurality of partitions to form a plurality of compartments for holding a filtering media for filtering a fluid; binding together a plurality of porous plates by a lap joint at at least one of the partitions; and securing the plurality of partitions to the plurality of porous plates so that each of the partitions is mounted atop a continuous portion of the porous plate to prevent the filtering media from passing therethough. Each of the plurality of partitions may be secured to the porous plate with angles and mounting bolts.

DETAILED DESCRIPTION

The invention will be understood more fully from the detailed description given below than from the accompanying drawings of the preferred embodiments of the invention; which, however, should not be taken to limit the invention to a specific embodiment, but are for explanation and understanding.

Figure 1A:
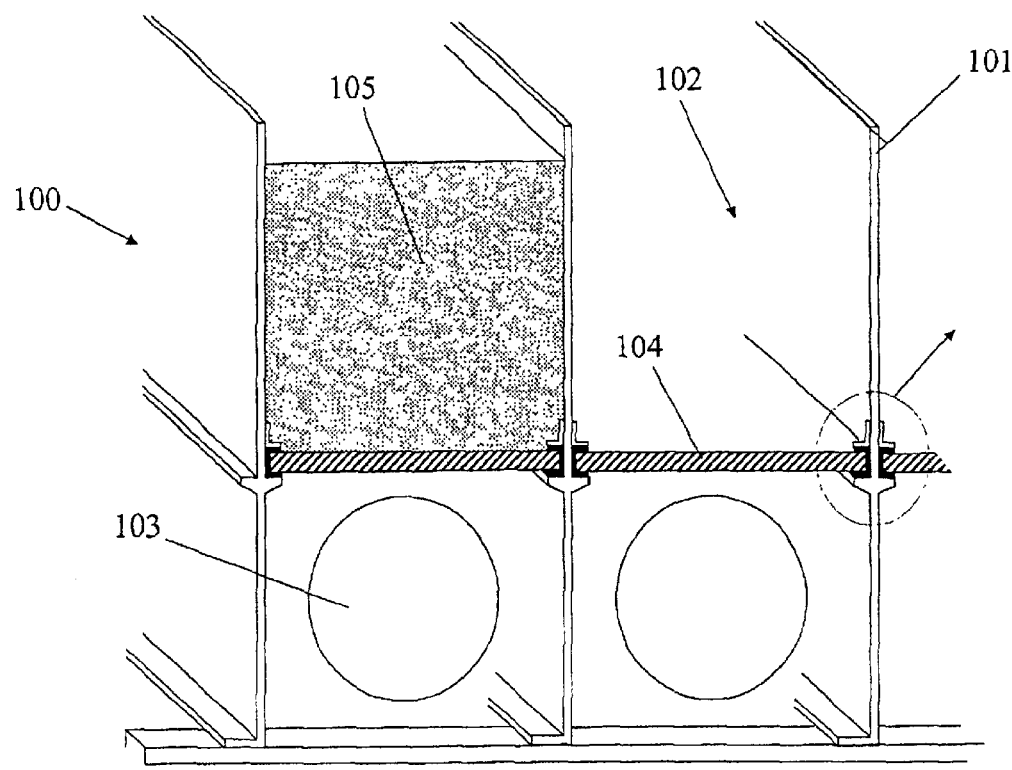
FIGS. 1(a)–1(b) are an isometric drawing and exploded view thereof, respectively, of the automatic backwash filter underdrain design of the prior art.
Figure 1B:
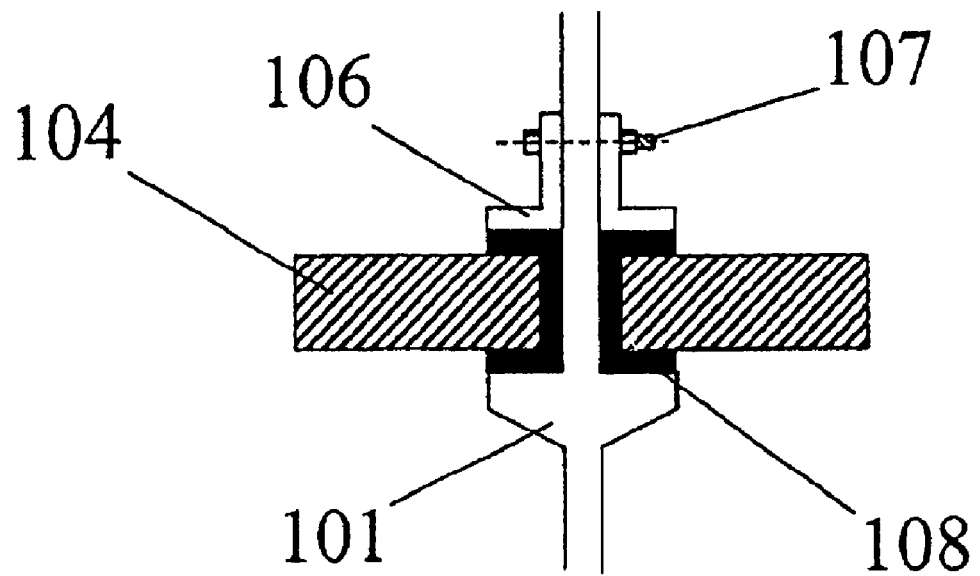
Figure 2:
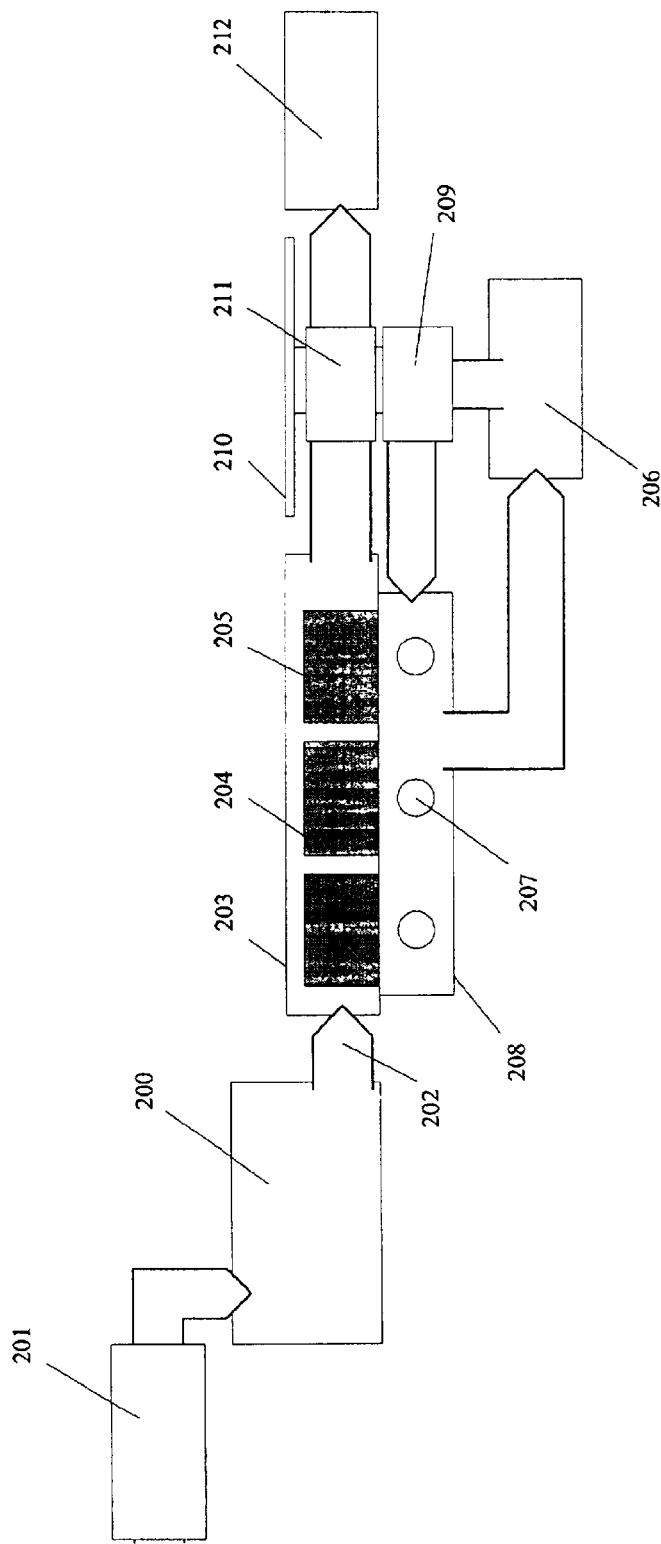
FIG. 2 is a diagram illustrating the components of a water filtration system incorporating an automatic backwash filter in accordance with aspects of the invention.

FIG. 2 is a general diagram illustrating the components of a water filtration system incorporating an automatic backwash filter. During filtration, water flows into filter tank 200 from influent channel 201, through influent ports 202, and onto filter bed 203, which contains a plurality of filter cells 204. Flow is downward through filter media 205 contained in each filter cell 204 in filter bed 203 and into effluent channel 206 through each effluent port 207 in each underdrain 208 of each filter cell 204, all in a conventional manner. The filter media is typically sand or a similar granular material, as is well known to those of skill in art.

The backwash process is usually initiated either by a predetermined head loss increase or by a preset time interval. Once initiated, the automatic backwash mechanism 209, typically suspended from a motor-driven carriage 210, draws water from the effluent channel and discharges it into the underdrain 208 of the filter cell 204 being backwashed. The backwash water expands and fluidizes media bed 205 in the filter cell 204 to release collected solids.

A washwater hood and pump 211, also suspended from the carriage 210, captures the released solids and discharge them into a washwater trough 212 to be carried away. Normally, backwash mechanism 209 moves along the entire length of the filter, backwashing each compartment in turn until all have been cleaned and the loss of head has returned to normal. All of filter cells 204, except those in the compartment being backwashed, usually remain in operation. Sufficient clean water is preferably maintained in effluent channel 206 to perform a backwash, eliminating the need for separate backwash water storage. Once carriage 210 reaches the end of filter tank 200, it typically sits with the pumps off until another backwash cycle is automatically initiated.

Backwashing is not normally carried to completion. Regularly repeated short cleaning cycles are preferably employed to keep the media in a nearly clean condition and limit solids penetration to the upper 2 to 3 inches of the media. The presence of some material within the bed aids in the removal of particulate material during filtration.

Figure 3A:
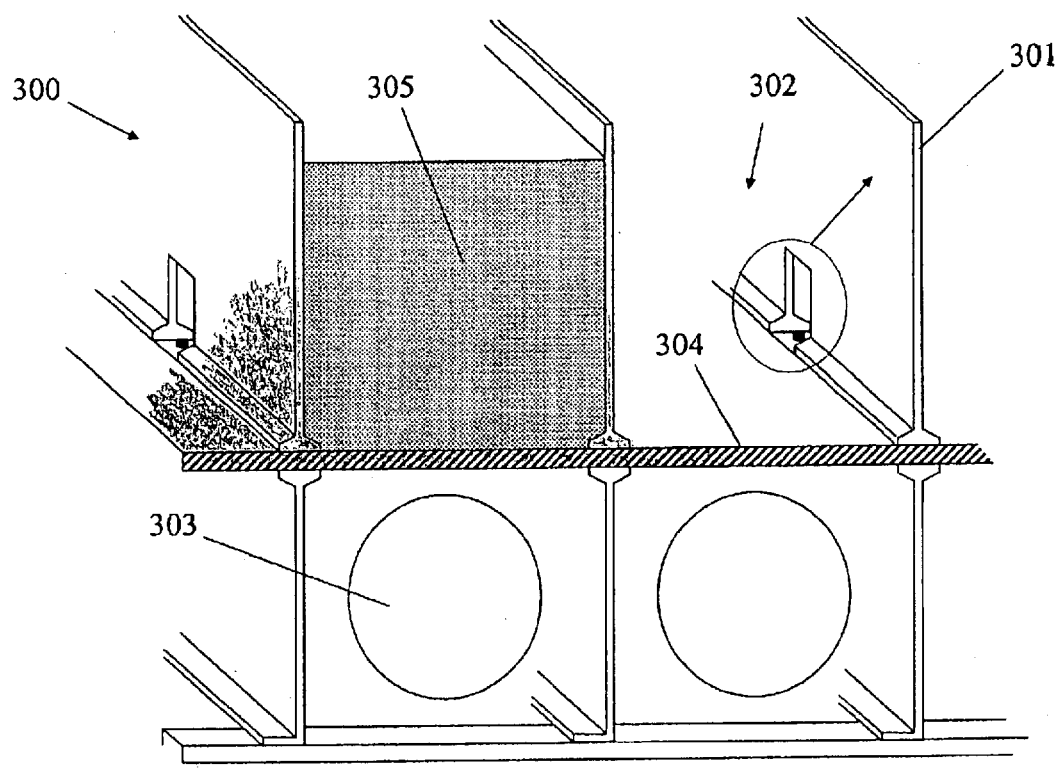
FIGS. 3(a)–(b) are an isometric drawing and exploded view, thereof, respectively, of the automatic backwash filter in accordance with aspects of the invention.
Figure 3B:
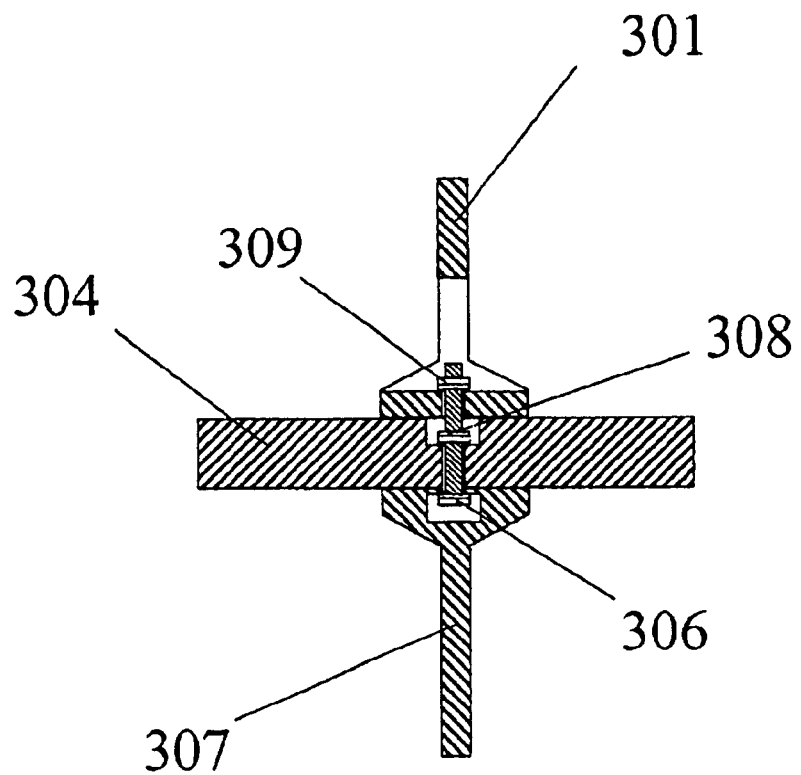

FIGS. 3(a)–(b) illustrate a preferred embodiment of the automatic backwash filter system of the invention. Automatic backwash filter 300 includes a series of lateral partitions 301, which divide the filter into a plurality of compartments 302. Each compartment is arranged for connection to a separate effluent or backwash port 303. Each partition 301 is supported on porous plate 304. Filter sand media 305 is filled in each compartment. Filter sand media 305 is typically filled to a depth to approximately eleven inches.

Porous plate 304 is formed so as to be large enough to provide a media support for a plurality of cells. In a preferred embodiment, porous plate 304 is approximately four feet by eight feet and provides support for either six eight inch cells or four twelve inch cells. As shown in FIG. 3(b), partition 301 is thus mounted directly atop a continuous section of porous plate 304, using mounting bolt hardware 306, without the need for any caulking. In a preferred embodiment, although not limited thereto, porous plate 304 is first mounted to lower support 307 of the effluent port, by nut 308, which is recessed within porous plate 304 as shown. Then, partition 301 is mounted flush atop porous plate 304 and secured with nut 309.

The automatic backwash filter typically operates at hydraulic loading rates of 2 to 3 gallons per minute per square foot. Backwash is initiated at a head loss increase of 2 to 6 inches over clean bed conditions. Once initiated, the backwash process continues from one end of the filter to the other with all cells remaining in service except the one being backwashed. Backwash typically occurs once every 2 to 6 hours, and each cell is backwashed for approximately 30 seconds.

The total operating head loss through the filter is typically 6 to 10 inches of water. The media in each compartment is preferably an 11-inch bed of sand, which is supported by the aforementioned plastic or ceramic porous plates. For some applications, alternative media designs such as dual sand and anthracite coal media up to 16 to 24 inches in depth or activated carbon up to 48" in depth are employed.

Although this invention has been described with reference particular embodiments, it will be appreciated that many variations may be resorted to without departing from the spirit and scope of this invention, as set forth in the appended claims.

What is claimed is:

1. An automatic backwash filter comprising:

at least one influent port for introducing a fluid to said filter;

a plurality of partitions, said partitions forming a plurality of compartments for holding a filtering media for filtering said fluid;

at least one porous plate that supports said plurality of partitions; wherein each of said partitions is mounted atop a continuous portion of said porous plate directly above a lower support; and at least one effluent port for draining said fluid away from said compartments.

2. The automatic backwash filter of claim 1, further comprising a filter media contained in at least one of said compartments for filtering a fluid, wherein said filter media comprises one or more selected from the group consisting of sand, anthracite coal, and activated carbon.

3. The automatic backwash filter of claim 1, wherein said porous plate comprises one or more materials selected from the group consisting of plastics and ceramics.

4. The automatic backwash filter of claim 1, further comprising a plurality of porous plates, wherein said porous plates are bound together by a lap joint at at least one of said partitions.

5. The automatic backwash filter of claim 1, wherein said porous plate is approximately four feet by eight feet and there are six of said compartments each measuring about eight inches in width.

6. The automatic backwash filter of claim 1, wherein said porous plate is approximately four feet by eight feet and there are four of said compartments each measuring about twelve inches in width.

7. The automatic backwash filter of claim 1, wherein each of said plurality of partitions is secured to said porous plate with angles and mounting bolts.

8. An automatic backwash filter comprising:

at least one influent port for allowing fluid to enter said filter;

a plurality of lower supports;

a plurality of porous plates mounted on one or more of the lower supports, said porous plates being bound together by a lap joint to form a continuous surface;

a plurality of partitions mounted on said porous plates to form a plurality of compartments to receive said fluid from said influent port;

at least one effluent port for draining said fluid from said filter;

wherein each of said partitions is mounted atop a continuous portion of one or more of the porous plates directly above one or more of the lower supports.

9. The automatic backwash filter of claim 8, further comprising a filter media contained in at least one of said compartments for filtering a fluid, wherein said filter media comprises one or more selected from the group consisting of sand, anthracite coal, and activated carbon.

10. The automatic backwash filter of claim 8, wherein said porous plate comprises one or more materials selected from the group consisting of plastics and ceramics.

11. The automatic backwash filter of claim 8, further comprising a plurality of porous plates, wherein said porous plates are bound together by a lap joint at at least one of said partitions.

12. The automatic backwash filter of claim 8, wherein said porous plate is approximately four feet by eight feet and there are six of said compartments each measuring about eight inches in width.

13. The automatic backwash filter of claim 8, wherein said porous plate is approximately four feet by eight feet and there are four of said compartments each measuring about twelve inches in width.

14. The automatic backwash filter of claim 8, wherein each of said plurality of partitions is secured to said porous plate with angles and mounting bolts.

15. A method for preparing an automatic backwash filtering system comprising the steps of:

mounting at least one porous plate on at least one lower support;

arranging a plurality of partitions to form a plurality of compartments for holding a filtering media for filtering a fluid; and securing said plurality of partitions to at least one of the porous plates so that each of said partitions is mounted atop a continuous portion of at least one of the porous plates directly above at least one of the lower supports to prevent said filtering media from passing therethrough.

16. The method of claim 15, further comprising the step of attaching at least one influent port for allowing fluid to enter said filter and at least one effluent port for draining said fluid from said filter.

17. The method of claim 15, wherein said plurality of partitions are secured to a plurality of plates and wherein said plurality of porous plates are bound together by a lap joint at at least one of said partitions.

18. The method of claim 15, wherein each of said plurality of partitions is secured to said porous plate with angles and mounting bolts.

19. A method for preparing an automatic backwash filtering system comprising the steps of:

arranging a plurality of partitions to form a plurality of compartments for holding a filtering media for filtering a fluid;

binding together a plurality of porous plates by a lap joint at at least one of said partitions; and securing said plurality of partitions to said plurality of porous plates so that each of said partitions is mounted atop a continuous portion of at least one of the porous plates directly above at least one lower support to prevent said filtering media from passing therethrough.

20. The method of claim 19, wherein each of said plurality of partitions is secured to said porous plate with angles and mounting bolts.

21. The automatic backwash filter of claim 1 further comprising a bolt connecting the at least one porous plate to the lower support and connecting one of the partitions to the at least one porous plate.

* * * * *